US012752790B2

(12) United States Patent
Shimizu

(10) Patent No.: US 12,752,790 B2
(45) Date of Patent: Oct. 6, 2026

(54) PRECEDING VEHICLE IDENTIFICATION APPARATUS AND PRECEDING VEHICLE IDENTIFICATION METHOD

(71) Applicant: DENSO CORPORATION, Kariya-city (JP)

(72) Inventor: Syun Shimizu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 350 days.

(21) Appl. No.: 17/812,286

(22) Filed: Jul. 13, 2022

(65) Prior Publication Data

US 2022/0340142 A1 Oct. 27, 2022

Related U.S. Application Data

(63) Continuation of application No. PCT/JP2020/048190, filed on Dec. 23, 2020.

(30) Foreign Application Priority Data

Jan. 17, 2020 (JP) ................................ 2020-006257

(51) Int. Cl.
*B60W 40/04* (2006.01)
*B60W 30/14* (2006.01)
*B60W 50/00* (2006.01)

(52) U.S. Cl.
CPC ........ *B60W 40/04* (2013.01); *B60W 50/0097* (2013.01); *B60W 30/14* (2013.01); *B60W 2554/4041* (2020.02); *B60W 2555/60* (2020.02)

(58) Field of Classification Search
CPC .. B60W 40/04; B60W 50/0097; B60W 30/14; B60W 2554/4041; B60W 2555/60; B60W 2556/50; G08G 1/16
See application file for complete search history.

(56) References Cited

U.S. PATENT DOCUMENTS

2013/0030687 A1* 1/2013 Shida .................... G01S 5/0072 701/301
2018/0025646 A1* 1/2018 Jeon ..................... G05D 1/0077 701/41
2019/0184990 A1 6/2019 Lee et al.
2020/0070819 A1* 3/2020 Tominaga .............. G08G 1/163
2020/0172100 A1 6/2020 Kato et al.
2021/0349463 A1* 11/2021 Kurotobi ......... B60W 30/18145

FOREIGN PATENT DOCUMENTS

JP 2000-137900 A 5/2000
NO 2016/024318 A1 2/2016

* cited by examiner

*Primary Examiner* — Navid Z. Mehdizadeh
(74) *Attorney, Agent, or Firm* — Precision Patents, P.C.

(57) ABSTRACT

A preceding vehicle identification apparatus includes: a route acquisition portion that acquires an anticipated route along which the subject vehicle is expected to travel at a future time; a region specification portion that defines a region in which the preceding vehicle is estimated to exist as an estimated region by adding an acceptable error range that is margin of error in predicting a position of the preceding vehicle to a scheduled travel region of the subject vehicle that is defined based on the anticipated route; and a preceding vehicle settling portion that identifies an other vehicle as the preceding vehicle when the other vehicle is determined to exist in the estimated region.

22 Claims, 8 Drawing Sheets

PRECEDING VEHICLE IDENTIFICATION APPARATUS AND PRECEDING VEHICLE IDENTIFICATION METHOD

CROSS REFERENCE TO RELATED APPLICATIONS

This application is a continuation application of International Patent Application No. PCT/JP2020/048190 filed on Dec. 23, 2020, which designated the U.S. and claims the benefit of priority from Japanese Patent Application No. 2020-006257 filed on Jan. 17, 2020. The entire disclosure of all of the above application is incorporated herein by reference.

TECHNICAL FIELD

The present disclosure relates to a technology to identify a preceding vehicle that precedes a subject vehicle.

BACKGROUND ART

There has been known an apparatus to control the longitudinal speeds of a vehicle. The apparatus acquires travel waypoints from a map database using the central waypoint concerning points where the vehicle is positioned. The apparatus adjusts the longitudinal speeds of the vehicle based on a preceding object in the scheduled travel region that is determined based on the acquired travel waypoints.

SUMMARY

One aspect of the present disclosure is a preceding vehicle identification apparatus to identify a preceding vehicle ahead of a subject vehicle. The apparatus includes: a route acquisition portion that is configured to acquire an anticipated route along which the subject vehicle is expected to travel at a future time; a region specification portion that is configured to define a region in which the preceding vehicle is estimated to exist as an estimated region by adding an acceptable error range that is margin of error in predicting a position of the preceding vehicle to a scheduled travel region of the subject vehicle that is defined based on the anticipated route; and a preceding vehicle settling portion that is configured to identify an other vehicle as the preceding vehicle when the other vehicle is determined to exist in the estimated region. The preceding vehicle settling portion is configured to identify the other vehicle as the preceding vehicle upon determining that an area condition is met. The area condition is determined to be met when an overlapping proportion between the estimated region and an existing region of the other vehicle exceeds a threshold range.

BRIEF DESCRIPTION OF DRAWINGS

The above and other objects, features, and advantages of the present disclosure will become more apparent from the following detailed description made by reference to the accompanying drawings. In the drawings.

DESCRIPTION OF EMBODIMENTS

Figure 1:
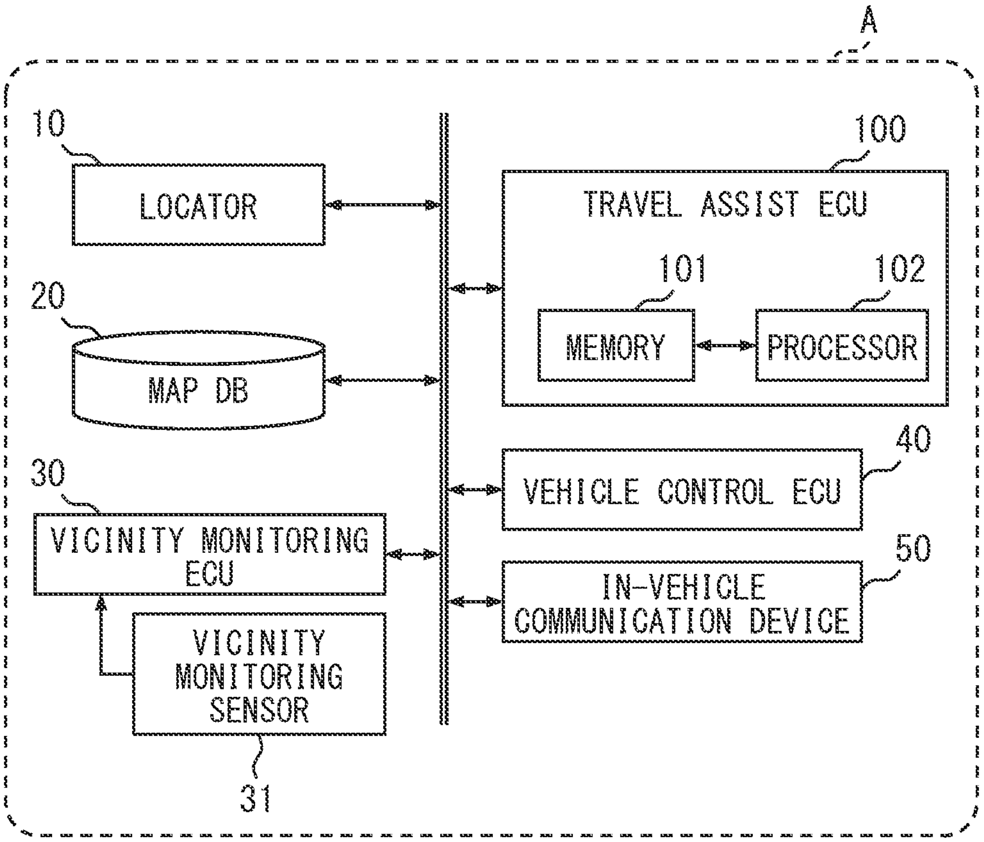
FIG. 1 is a diagram illustrating a system including a travel assist ECU.

To begin with, a relevant technology will be described only for understanding the following embodiments.

The above-described technology sets a scheduled travel region using travel waypoints that are set based on lane information included in the map database. However, according to the technology, the scheduled travel region may significantly deviate from an actual vehicle travel range if the scheduled travel region is generated in an area where there are no lanes such as an intersection. There is a risk that causes the preceding vehicle is not covered by the generated scheduled travel region, which would result in failure to identify the preceding vehicle.

It is an objective of the present disclosure to provide a preceding vehicle identification apparatus, a preceding vehicle identification method, and a preceding vehicle identification program which are capable of accurately identifying a preceding vehicle.

As described above, the one aspect of the present disclosure is a preceding vehicle identification apparatus to identify a preceding vehicle ahead of a subject vehicle. The apparatus includes: a route acquisition portion that is configured to acquire an anticipated route along which the subject vehicle is expected to travel at a future time; a region specification portion that is configured to define a region in which the preceding vehicle is estimated to exist as an estimated region by adding an acceptable error range that is margin of error in predicting a position of the preceding vehicle to a scheduled travel region of the subject vehicle that is defined based on the anticipated route; and a preceding vehicle settling portion that is configured to identify an other vehicle as the preceding vehicle when the other vehicle is determined to exist in the estimated region. The preceding vehicle settling portion is configured to identify the other vehicle as the preceding vehicle upon determining that an area condition is met. The area condition is determined to be met when an overlapping proportion between the estimated region and an existing region of the other vehicle exceeds a threshold range.

A second aspect of the present disclosure is a preceding vehicle identification method performed by a processor for identifying a preceding vehicle ahead of a subject vehicle. The method includes the steps of: acquiring an anticipated route along which the subject vehicle is expected to travel at a future time; defining a region in which the preceding vehicle is estimated to exist as an estimated region by adding an acceptable error range that is margin of error in predicting a position of the preceding vehicle to a scheduled travel region of the subject vehicle that is defined based on the anticipated route; and identifying an other vehicle as the preceding vehicle when the other vehicle is determined to exist in the estimated region. The step of identifying the other vehicle further includes identifying the other vehicle as the preceding vehicle upon determining that an area condition is met. The area condition is determined to be met when an overlapping proportion between the estimated region and an existing region of the other vehicle exceeds a threshold range.

According to the disclosures, a region where a preceding vehicle is expected to exist is defined as the estimated region by adding an acceptable error range to a scheduled travel region for the subject vehicle that is defined based on an anticipated route along which the subject vehicle is estimated to travel in a future time. The other vehicle determined to exist in the estimated region is identified as a preceding vehicle. The estimated region includes not only the scheduled travel region for the subject vehicle but also the acceptable error range that is an acceptable error in predicting the position of the preceding vehicle. The preceding vehicle is more likely to exist in the estimated region. Therefore, it is possible to provide a preceding vehicle identification apparatus, a preceding vehicle identification method, and a preceding vehicle identification program that are capable of accurately identifying a preceding vehicle.

A third aspect of the present disclosure is a preceding vehicle identification apparatus to identify a preceding vehicle ahead of a subject vehicle. The apparatus includes: a region specification portion that is configured to define an estimated region in which the preceding vehicle is expected to exist, the estimated region including an entrance and an exit of a travel-scheduled section for the subject vehicle; an estimated region adjusting portion that is configured to eliminate, from the estimated region, a restricted region where travel restriction is recommended due to a traffic rule; and a preceding vehicle settling portion that is configured to identify, as the preceding vehicle, an other vehicle determined to exit in a reduced estimated region that is defined by eliminating the restricted region from the estimated region. The preceding vehicle settling portion is further configured to identify the other vehicle as the preceding vehicle upon determining that an area condition is met. The area condition is determined to be met when an overlapping proportion between the reduced estimated region and an existing region of the other vehicle exceeds a threshold range.

A fourth aspect of the present disclosure is a preceding vehicle identification method performed by a processor for identifying a preceding vehicle ahead of a subject vehicle. The method includes the steps of: defining an estimated region in which the preceding vehicle is expected to exist, the estimated region including an entrance and an exit of a travel-scheduled section for the subject vehicle; eliminating, from the estimated region, a restricted region where travel restriction is recommended due to a traffic rule; and identifying, as the preceding vehicle, an other vehicle upon determining that the other vehicle exists in a reduced estimated region that is defined by eliminating the restricted region from the estimated region. The step of identifying the other vehicle further includes identifying the other vehicle as the preceding vehicle upon determining that an area condition is met. The area condition is determined to be met when an overlapping proportion between the reduced estimated region and an existing region of the other vehicle exceeds a threshold range.

According to the disclosure, the estimated region the preceding vehicle is expected to exist is defined to include the entrance and the exit of a travel-scheduled section for the subject vehicle. A restricted region the travel restriction is recommended based on a traffic rule is removed from the estimated region. The other vehicle is identified as a preceding vehicle when the other vehicle is determined to exist in the reduced estimated region. The preceding vehicle is more likely to exist in the reduced estimated region because the preceding vehicle will travel in the travel-scheduled section while avoiding the restricted region. Therefore, it is possible to provide a preceding vehicle identification apparatus, a preceding vehicle identification method, and a preceding vehicle identification program capable of accurately identifying a preceding vehicle.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

First Embodiment

With reference to FIGS. 1 to 4, the description below explains the preceding vehicle identification apparatus according to the first embodiment. In the first embodiment, a travel assist ECU 100 mounted on subject vehicle A provides the preceding vehicle identification apparatus. Subject vehicle A includes at least a driver assist function to assist the driver's driving operation or an automatic operation function capable of substituting the driver's driving operation. The travel assist ECU 100 is connected to a locator 10, a map database (DB) 20, a vicinity monitoring ECU 30, a vehicle control ECU 40, an in-vehicle communication device 50, and a display apparatus 60 via a communication bus, for example.

The locator 10 includes a GNSS (Global Navigation Satellite System) receiver and an inertial sensor. The GNSS receiver receives positioning signals from multiple positioning satellites. The inertial sensor detects an inertial force acting on subject vehicle A. The inertial sensor includes a gyro sensor and an acceleration sensor, for example. The locator 10 successively measures positions (subject vehicle positions) of subject vehicle A by combining positioning signals received by the GNSS receiver and measurement results from the inertial sensor. The subject vehicle positions may be represented by coordinates of longitude and latitude, for example. The measurement of subject vehicle positions may use the mileage acquired from signals successively output from a vehicle speed sensor mounted on subject vehicle A.

The map DB 20 is available as non-volatile memory and stores map data such as link data, node data, road shapes, and structures. The map data may provide a three-dimensional map composed of point groups of feature points representing road shapes and structures. When the three-dimensional is used as map data, the locator 10 may specify subject vehicle positions by using the three-dimensional map and detection results from a peripheral monitoring sensor 31 without using the GNSS receiver. The three-dimensional map may be generated based on captured images according to REM (Road Experience Management). The map data may include traffic regulation information, road construction information, meteorological information, and signal information, for example. The map data stored in the map DB 20 is updated periodically or on an as-needed basis, based on the latest information received by the in-vehicle communication device 50.

The vicinity monitoring ECU 30 is mainly composed of a microcomputer including a processor, memory, I/O, and a bus connecting these, and executes a control program stored in the memory to provide various processes. The proximity monitoring ECU 30 recognizes the driving environment of the subject vehicle based on detection results from the vicinity monitoring sensor 31. The vicinity monitoring sensor 31 is an autonomous sensor to monitor the surrounding environment around subject vehicle A and includes LiDAR (Light Detection and Ranging/Laser Imaging Detection and Ranging) and a vicinity monitoring camera. The LiDAR detects a point group of feature points of the features. The vicinity monitoring camera captures a predetermined range including the front of the vehicle. The proximity monitoring sensor 31 may include a millimeter-wave radar or a sonar, for example. The vicinity monitoring ECU 30 performs an image analysis process to recognize the presence or absence and positions of obstacles and other vehicles such as a preceding vehicle, parallel traveling vehicles, and oncoming vehicles in the traveling region based on point group images acquired from the LiDAR or captured images acquired from the camera, for example, The vehicle control ECU 40 is an electronic control apparatus that controls acceleration, deceleration, and steering of subject vehicle A. The vehicle control ECU 40 includes a steering ECU for steering control, a power unit control ECU for acceleration/deceleration control, and a brake ECU, for example. The vehicle control ECU 40 acquires detection signals output from sensors such as a steering angle sensor and a vehicle speed sensor mounted on subject vehicle A and outputs control signals to travel control devices such as an electronically controlled throttle, a brake actuator, and an EPS (Electric Power Steering) motor, for example. The vehicle control ECU 40 acquires a control request (described later) concerning subject vehicle A from the travel assist ECU 100 and thereby controls the travel control devices to provide autonomous travel or driving support according to the control request.

The in-vehicle communication device 50 is a communication module installed in subject vehicle A. The in-vehicle communication device 50 includes at least the function of V2N (Vehicle to cellular Network) communications compliant with communication standards such as LTE (Long Term Evolution) and 5G and transmits and receives radio waves from base stations around subject vehicle A. The in-vehicle communication device 50 may further include functions such as vehicle-to-roadside infrastructure (V2I) communication and vehicle-to-vehicle (V2V) communication. The in-vehicle communication device 50 uses the V2N communication to enable the cooperation (Cloud to Car) between the cloud and the in-vehicle system. The in-vehicle communication device 50 allows subject vehicle A to be available as a connected car capable of connection to the Internet.

The travel assist ECU 100 is an electronic control apparatus that outputs control instructions on subject vehicle A from the advanced driver assist function or the automatic operation function to the vehicle control ECU 40 based on the information from the locator 10, the map DB 20, and the vicinity monitoring ECU 30 described above, for example. The travel assist ECU 100 can provide the ACC (Adaptive Cruise Control) function as an advanced driver assist function by adjusting the driving force and the braking force. The ACC function controls the travel speeds of subject vehicle A to maintain the target inter-vehicle distance to a preceding vehicle.

The travel assist ECU 100 mainly includes a computer equipped with memory 101, a processor 102, an input/output interface, and a bus connecting these. The processor 102 is hardware for arithmetic processing. The processor 102 includes at least one of a CPU (Central Processing Unit), a GPU (Graphics Processing Unit), and a RISC (Reduced Instruction Set Computer) CPU as a core, for example.

The memory 101 permanently stores computer-readable programs and data, for example, and is available as at least one type of non-transitory tangible storage media such as semiconductor memory, magnetic media, and optical media. The memory 101 stores various programs such as a route generation program (described later) executed by the processor 102.

Figure 2:
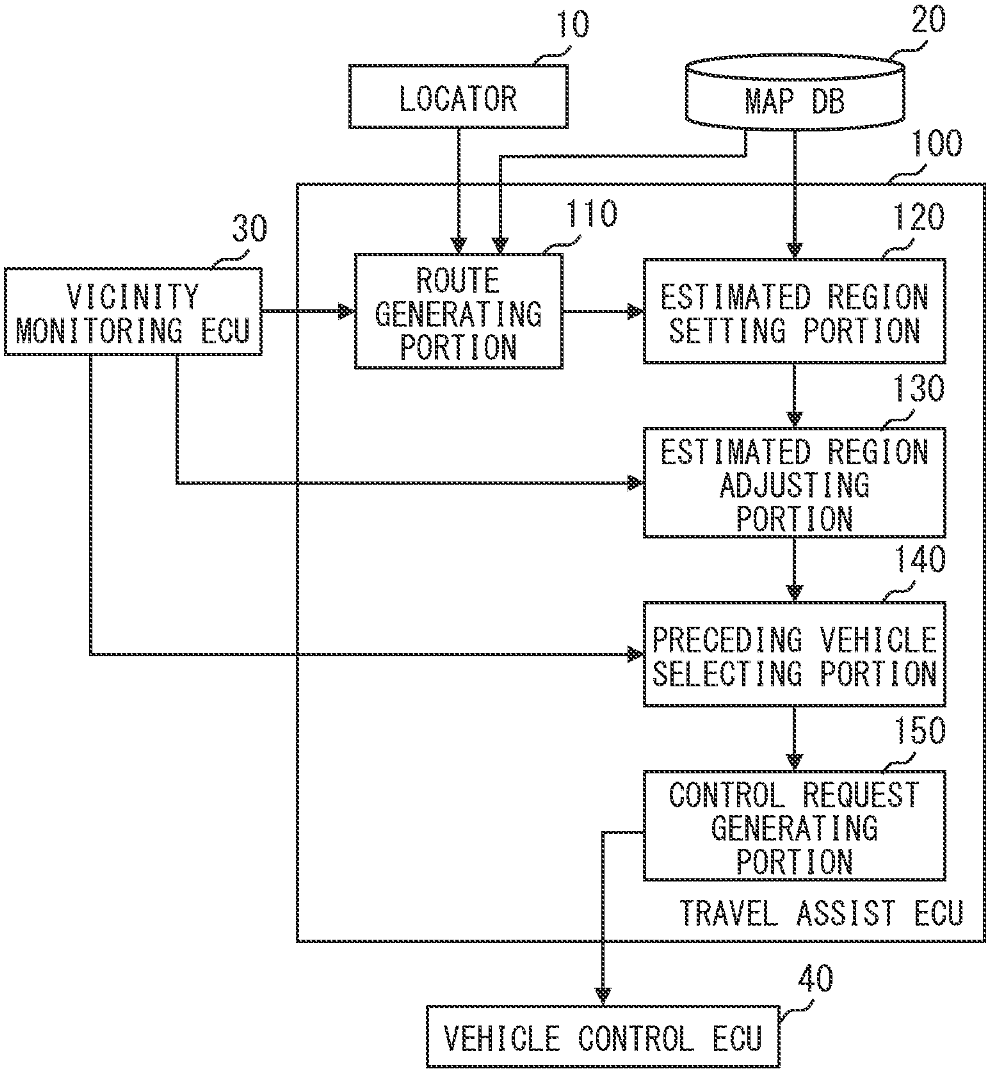
FIG. 2 is a block diagram illustrating functions provided by the travel assist ECU.
Figure 4:
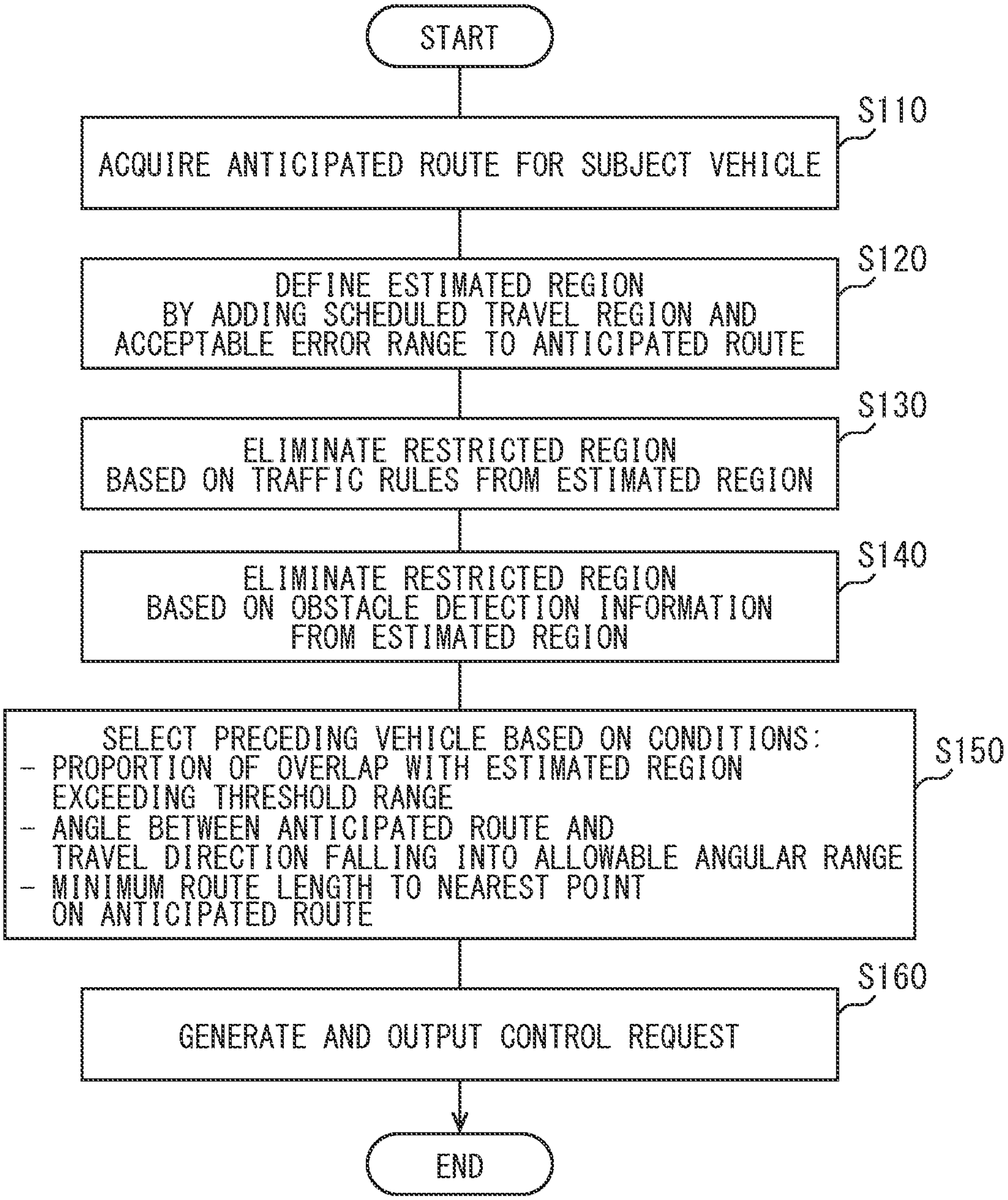
FIG. 4 is a flowchart illustrating a preceding vehicle identification process performed by the travel assist ECU.
Figure 7:
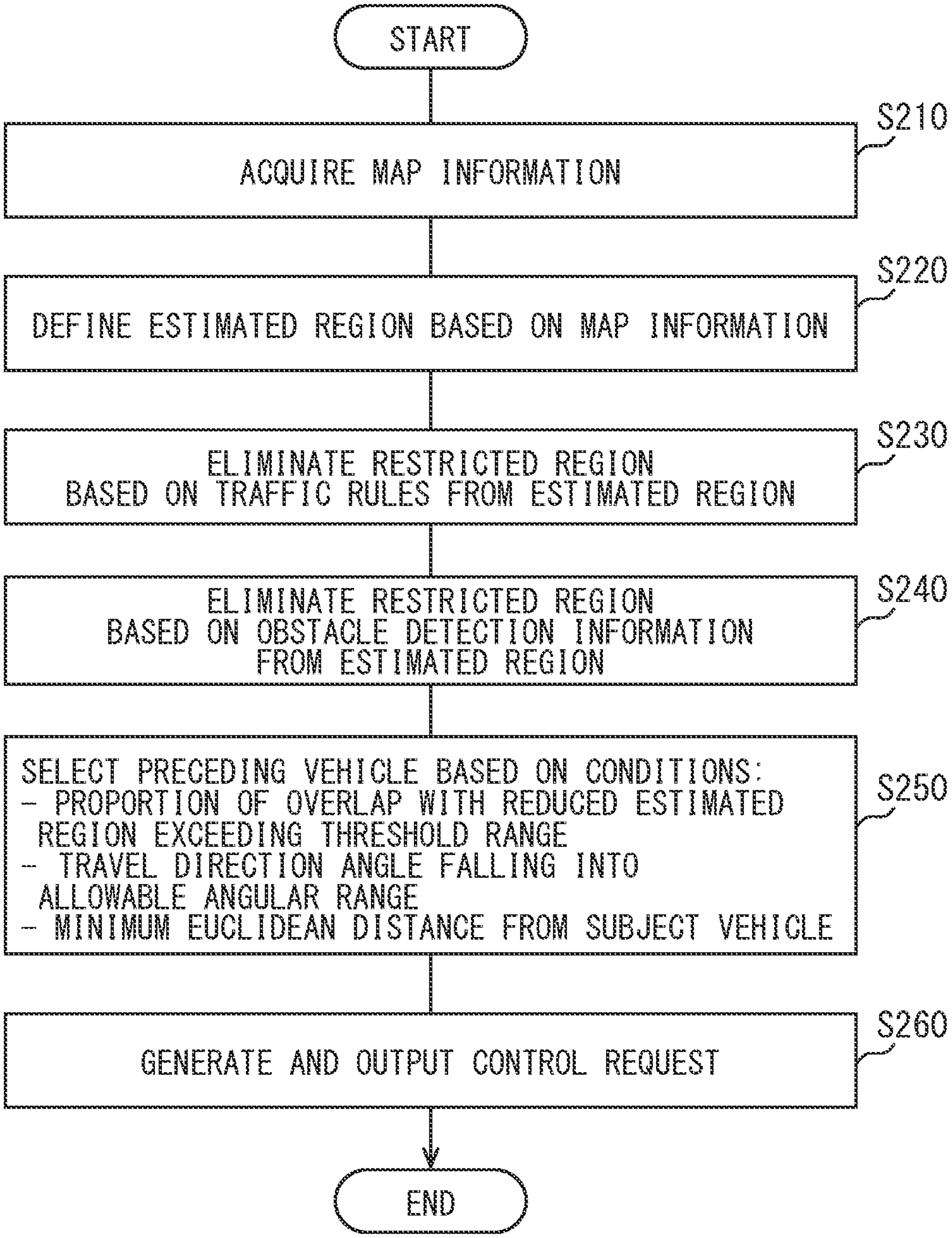
FIG. 7 is a flowchart illustrating a preceding vehicle identification process performed by the travel assist ECU according to the second embodiment.
Figure 8:
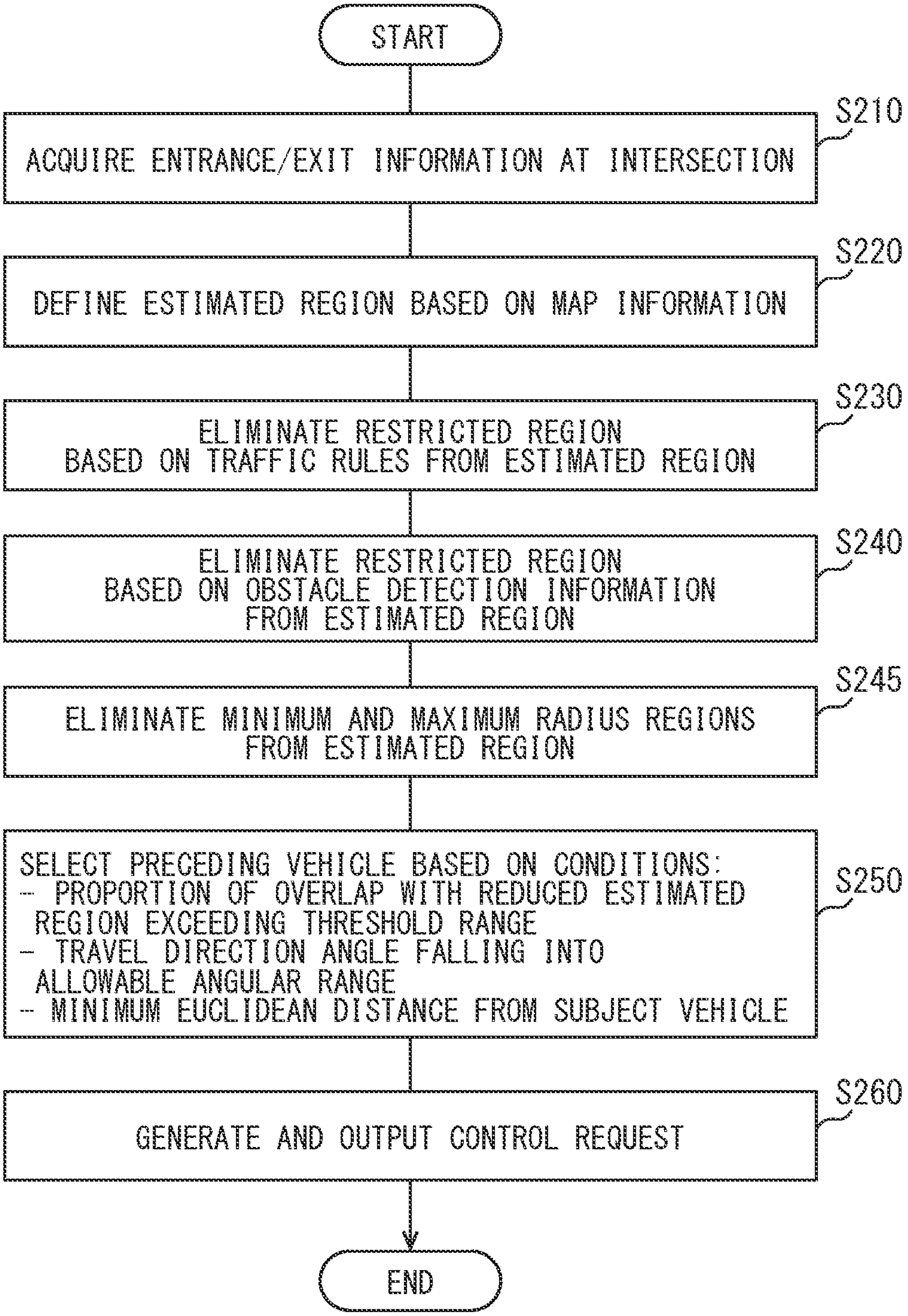
FIG. 8 is a flowchart illustrating a preceding vehicle identification process performed by the travel assist ECU according to a modification of the second embodiment.

The processor 102 executes multiple instructions included in a preceding vehicle identification program (to be described) that is stored in the memory 101 and is illustrated as flowcharts in FIGS. 4, 7, and 8. The travel assist ECU 100 thus configures multiple functional portions to generate anticipated route PR. The travel assist ECU 100 configures multiple functional portions by allowing the processor 102 to execute multiple instructions of the program stored in the memory 101 for the drive assist. Specifically, as illustrated in FIG. 2, the travel assist ECU 100 includes functional portions such as a route generating portion 110, an estimated region setting portion 120, an estimated region adjusting portion 130, a preceding vehicle selecting portion 140, and a control request generating portion 150.

The route generating portion 110 generates and thereby acquires anticipated route PR assumed to be traveled by subject vehicle A in the future. The route generating portion 110 exemplifies a “route acquisition portion.” Anticipated route PR defines positions and directions, for example, at points traveled by subject vehicle A. For example, when the automatic operation function is performed, anticipated route PR represents a vehicular swept path actually traveled by subject vehicle A. When the advanced driver assist function performs the drive assist, anticipated route PR represents an ordinary or ideal vehicular swept path to be traveled to a destination.

In detail, the route generating portion 110 first settles an anticipated behavior scheduled for subject vehicle A based on subject vehicle position information from the locator 10, map information from the map DB, and recognition information from the vicinity monitoring ECU 30, for example. The anticipated behavior signifies an operational behavior required of subject vehicle A in the future to reach the destination. The anticipated behavior includes turning right or left at intersections and other branching points and changing lanes, for example. The route generating portion 110 sets multiple crossing points required to achieve the settled anticipated behavior and calculates an interpolated curve connecting the crossing points as anticipated route PR. For example, the route generating portion 110 defines intersection entrance and exit as crossing points and generates a B-spline curve interpolating between the entrance and the exit as anticipated route PR. The route generating portion 110 supplies the generated anticipated route PR to the estimated region setting portion 120.

The estimated region setting portion 120 settles an estimated region PA where a preceding vehicle is estimated to exist, based on the generated anticipated route PR. The estimated region PA is set by adding an acceptable error range PA2, which is an acceptable error in predicting a position of the preceding vehicle, to the scheduled travel region PA1 for subject vehicle A that is defined based on anticipated route PR. For example, the estimated region setting portion 120 defines the scheduled travel region PA1 as a region corresponding to the width of the subject vehicle A added in the width direction of anticipated route PR. The estimated region setting portion 120 defines the acceptable error range PA2 as a margin in consideration of the behavior of other vehicles. The width direction of anticipated route PR is orthogonal to anticipated route PR. The margin in consideration of the behavior of other vehicles may be settled based on probe data such as travel data of the subject vehicle A or the other vehicles. The margin in consideration of the behavior of the other vehicles may be provided as a predetermined value. The estimated region setting portion 120 supplies the estimated region PA to the estimated region adjusting portion 130. The estimated region setting portion 120 may be one example of a "region specification portion."

The estimated region adjusting portion 130 eliminates restricted region RA from estimated region PA. Restricted region RA recommends the travel restriction. The estimated region adjusting portion 130 eliminates first restricted region RA1 based on traffic rules, as an example of recommended region RA, from estimated region PA (see the center part in FIG. 3). For example, first restricted region RA1 based on traffic rules includes an area to recommend prohibiting or avoiding the travel according to traffic regulations. Specifically, the areas to recommend prohibiting or avoiding the travel according to traffic regulations include regions indicated by road markings such as a channelizing strip, instructions on turning right or left, a region partitioned by a guideline and not scheduled for subject vehicle A to travel, and both sides of a region partitioned by a guideline and scheduled for subject vehicle A to travel. The areas also include a road shoulder, a center divider, a roundabout center, a zone such as a traffic island, and a structural object. According to the example in FIG. 3, first restricted region RA1 based on traffic rules includes both sides of a region partitioned by a right-turn guideline and scheduled for subject vehicle A to travel, a region provided with a channelizing strip, a traffic island, and a center divider. First restricted region RA1 may include an area hardly likely to allow a preceding vehicle to enter based on traffic rules other than areas to recommend prohibiting or avoiding the travel according to traffic regulations. For example, the area hardly likely to allow a preceding vehicle to enter may be partitioned by a line connecting specific points in areas to recommend prohibiting or avoiding the travel according to traffic regulations.

Figure 3:
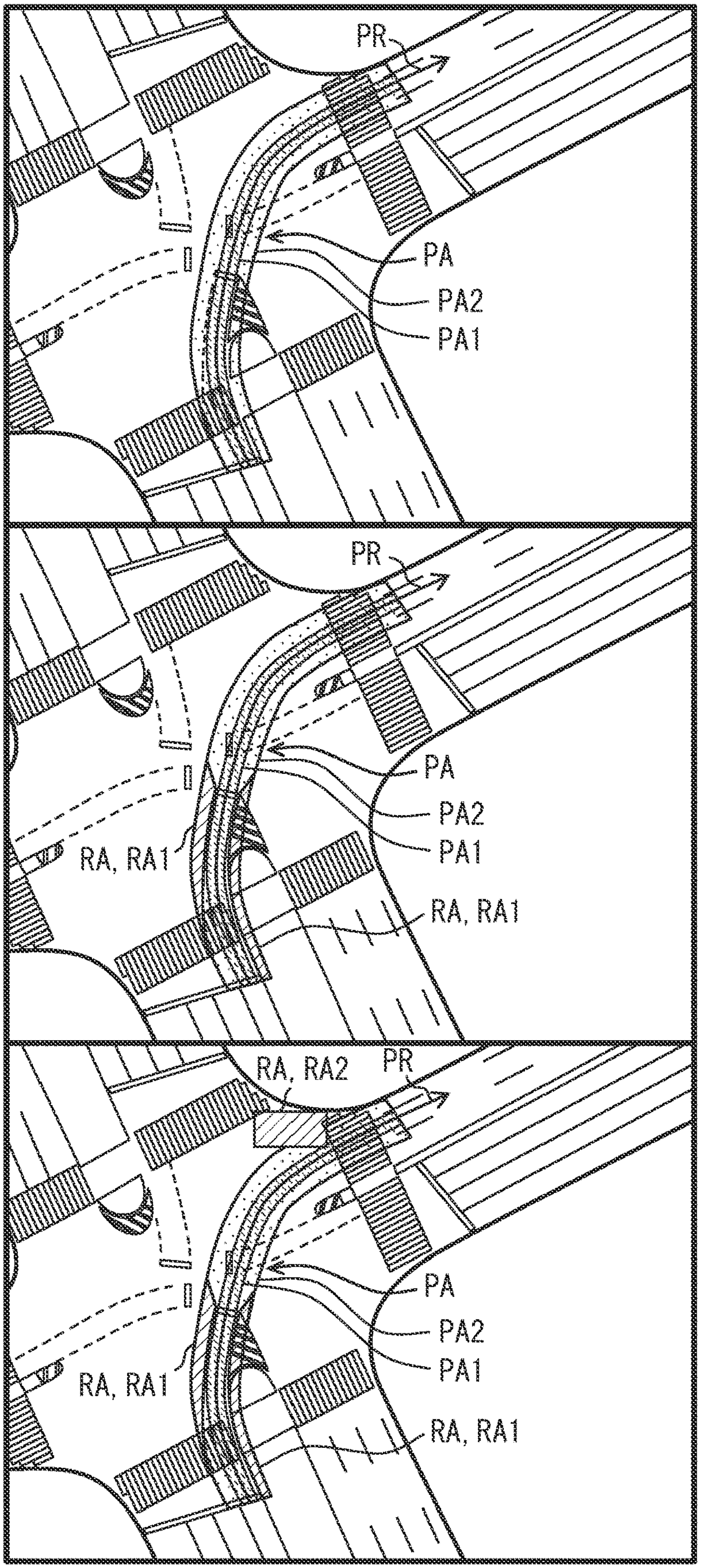
FIG. 3 is a diagram illustrating a way of defining and adjusting an estimated region.

Moreover, the estimated region adjusting portion 130 eliminates second restricted region RA2, as another example of recommended region RA, from estimated region PA (see the bottom part in FIG. 3). Second restricted region RA2 is based on information on detected obstacles to the travel of subject vehicle A. The detected obstacles to the travel of subject vehicle A include parked vehicles, falling objects on the road, pylons, and poles, for example. The estimated region adjusting portion 130 supplies the preceding vehicle selecting portion 140 with estimated region PA whose range is adjusted as above.

The preceding vehicle selecting portion 140 selects an other vehicle as a preceding vehicle for subject vehicle A based on estimated region PA and the detection information about other vehicles acquired from the vicinity monitoring ECU 30. For example, the preceding vehicle selecting portion 140 defines the preceding vehicle as an other vehicle that satisfies the area, angle, and distance conditions described below.

The area condition is used to determine whether an other vehicle is included in estimated region PA. Specifically, the preceding vehicle selecting portion 140 determines that the area condition is satisfied when an overlapping proportion between a region including other vehicles and estimated region PA exceeds a predetermined threshold range (such as 50% or less). The region including other vehicles is considered to enable the presence of an other vehicle and is given the position and the size, for example, based on the detection information about the other vehicle, for example. The preceding vehicle selecting portion 140 calculates the overlapping proportion concerning estimated region PA by assuming the region including other vehicles to be rectangular, for example. The region including other vehicles may be assumed to be any shape other than a rectangle. The determination that the area condition is satisfied is comparable to the determination that an other vehicle is included in estimated region PA.

The angle condition is assumed to be satisfied when an angle formed between anticipated route PR and the travel direction of the other vehicle falls into an allowable angular range (or a predetermined angular range). Specifically, the preceding vehicle selecting portion 140 calculates an angle between a half line extending from the other vehicle in the travel direction of the other vehicle and a half line extending from the point on anticipated route PR nearest to the other vehicle in the travel direction of anticipated route PR, namely, a tangent to anticipated route PR at the nearest point. The preceding vehicle selecting portion 140 determines that the angle condition is satisfied when the angle calculated as above is determined to fall into the allowable angular range. The angle condition is used to avoid identifying an other vehicle as a preceding vehicle when the other vehicle such as an oncoming vehicle travels in a direction different from that of subject vehicle A.

The distance condition is used when there are multiple other vehicles satisfying the area condition and the angle condition. The preceding vehicle selecting portion 140 determines the distance condition to be satisfied for an other vehicle that minimizes the path length from the beginning of anticipated route PR to the nearest point on anticipated route PR.

The preceding vehicle selecting portion 140 first determines whether the area condition is satisfied for the detected other vehicle. The preceding vehicle selecting portion 140 then determines whether the angle condition is satisfied for the other vehicle determined to satisfy the area condition. The preceding vehicle selecting portion 140 determines that no preceding vehicle exists if there is no other vehicle that satisfies both the area condition and the angle condition.

There may be only one other vehicle that satisfies both the area condition and the angle condition. Then, the preceding vehicle selecting portion 140 selects that other vehicle as a preceding vehicle. There may be multiple other vehicles that satisfy both the area condition and the angle condition. Then, the preceding vehicle selecting portion 140 selects an other vehicle satisfying the distance condition as a preceding vehicle. The preceding vehicle selecting portion 140 supplies the control request generating portion 150 with preceding vehicle information that indicates the presence or absence of a preceding vehicle, and the position or the travel direction, for example, of a preceding vehicle, if any. The preceding vehicle selecting portion 140 exemplifies a "preceding vehicle settling portion."

Based on the preceding vehicle information, the control request generating portion 150 generates a control request for subject vehicle A to maintain a target inter-vehicle distance to the preceding vehicle. The control request generating portion 150 outputs the generated control request to the vehicle control ECU 40.

The description below explains a flow of the preceding vehicle identification method performed by the travel assist ECU 100 in cooperation with functional portions, according to FIG. 4 by appropriate reference to FIGS. 2 and 3. The flows described below use the letter "S" to represent multiple steps in the flow executed by multiple instructions contained in the program.

At S110, the route generating portion 110 generates and acquires anticipated route PR for subject vehicle A. At S120, the estimated region setting portion 120 adds acceptable error range PA2 to scheduled travel region PA1 for subject vehicle A based on anticipated route PR and thereby defines estimated region PA supposed to include a preceding vehicle.

At S130, the estimated region adjusting portion 130 eliminates first restricted region RA1 based on traffic rules from estimated region PA. At S140, the estimated region adjusting portion 130 acquires detection information about an obstacle to the travel of subject vehicle A from the vicinity monitoring ECU 30 and eliminates second restricted region RA2 based on the detection information from estimated region PA.

At S150, the preceding vehicle selecting portion 140 selects a preceding vehicle from the detected other vehicles, based on estimated region PA deprived of restricted regions RA1 and RA2 as well as other vehicle information from the vicinity monitoring ECU 30. Specifically, at S150, the process selects an other vehicle that satisfies both the area condition and the angle condition. There may be only one other vehicle that satisfies the two conditions. Then, that other vehicle is assumed to be a preceding vehicle. There may be multiple other vehicles that satisfy the two conditions. Then, the other vehicle satisfying the distance condition is assumed to be a preceding vehicle.

At S160, the control request generating portion 150 generates a control request and outputs it to the vehicle control ECU 40. The control request contains information on acceleration/deceleration control and steering control to travel following the selected preceding vehicle. The process terminates upon completion of the steps described above.

As above, S110 exemplifies a "route acquisition process." S120 exemplifies a "region specification process." S130 and S140 exemplify an "estimated region adjusting process." S150 exemplifies a "preceding vehicle settling process."

The description below explains operations and effects provided by the first embodiment.

According to the first embodiment, estimated region PA is supposed to ensure the presence of a preceding vehicle and is generated by adding acceptable error range PA2 to scheduled travel region PA1 for subject vehicle A based on anticipated route PR assumed to be traveled by subject vehicle A in the future. The other vehicle determined to be included in estimated region PA is defined as a preceding vehicle. Estimated region PA includes scheduled travel region PA1 for subject vehicle A as well as acceptable error range PA2 allowed to estimate the position corresponding to the preceding vehicle. The preceding vehicle can be easily included in estimated region PA. The preceding vehicle can be accurately identified.

The first embodiment eliminates restricted region RA to recommend the travel restriction from estimated region PA. Namely, estimated region PA is deprived of restricted region RA that is relatively unlikely to include vehicles. It is possible to avoid misidentifying an object other than the preceding vehicle as a preceding vehicle.

In addition, the first embodiment eliminates first restricted region RA1 based on traffic rules from estimated region PA. Specifically, there may be a region where vehicles are relatively highly likely to avoid traveling due to traffic rules. Such a region can be eliminated from estimated region PA. It is possible to inhibit misidentifications and more accurately identify a preceding vehicle.

Further, the first embodiment eliminates second restricted region RA2 based on the detection information about obstacles to the travel of subject vehicle A from estimated region PA. A region likely to hinder the vehicle from traveling can be eliminated from estimated region PA. It is possible to inhibit misidentifications of a preceding vehicle in a region unlikely to include vehicles and more accurately identify a preceding vehicle.

According to the first embodiment, there may be a case of satisfying the area condition that the overlapping proportion between estimated region PA and the region corresponding to an other vehicle exceeds the threshold range. In such a case, the other vehicle is identified as a preceding vehicle. An other vehicle can be identified as a preceding vehicle even if the other vehicle partially exceeds estimated region PA. It is possible to avoid too strictly identifying the preceding vehicle and provide easy identification.

In addition, the first embodiment identifies an other vehicle as a preceding vehicle based on the determination that the area condition is satisfied and the angle condition is satisfied to ensure an allowable angular range for the angle between anticipated route PR and the travel direction of the other vehicle. Even if the area condition is satisfied, the other vehicle is not identified as a preceding vehicle when the angle between anticipated route PR and the travel direction of the other vehicle exceeds the allowable angular range. There may be other vehicles such as oncoming vehicles or vehicles turning left or right in a direction different from subject vehicle A. These other vehicles travel in such a direction as to disable the other vehicles from being identified as a preceding vehicle for subject vehicle A. It is possible to avoid identifying such other vehicles as a preceding vehicle. The preceding vehicle can be identified more accurately.

Moreover, the first embodiment identifies an other vehicle as a preceding vehicle based on the determination that the area condition and the angle condition are satisfied and the other vehicle has a minimum route length from the start point of anticipated route PR to the point nearest to the other vehicle on the anticipated route PR. The other vehicle nearest to subject vehicle A can be identified as a preceding vehicle when there are multiple other vehicles satisfying the area condition and the angle condition. The preceding vehicle can be reliably identified from among multiple other vehicles.

Second Embodiment

The second embodiment describes modifications of the travel assist ECU 100 according to the first embodiment. According to the second embodiment, the estimated region setting portion 120 defines estimated region PA as a region including the entrance and the exit of an intersection as a travel-scheduled section, namely, a section scheduled for subject vehicle A to travel. For example, the travel-scheduled section specifying estimated region PA is defined as a road section incapable of uniquely identifying a preceding vehicle because no lane is available or identifiable. Travel-scheduled sections specifying estimated region PA may include intersections, parking lots, the vicinity of expressway tollgates, and sections where the lane markings are faint.

Figure 5:
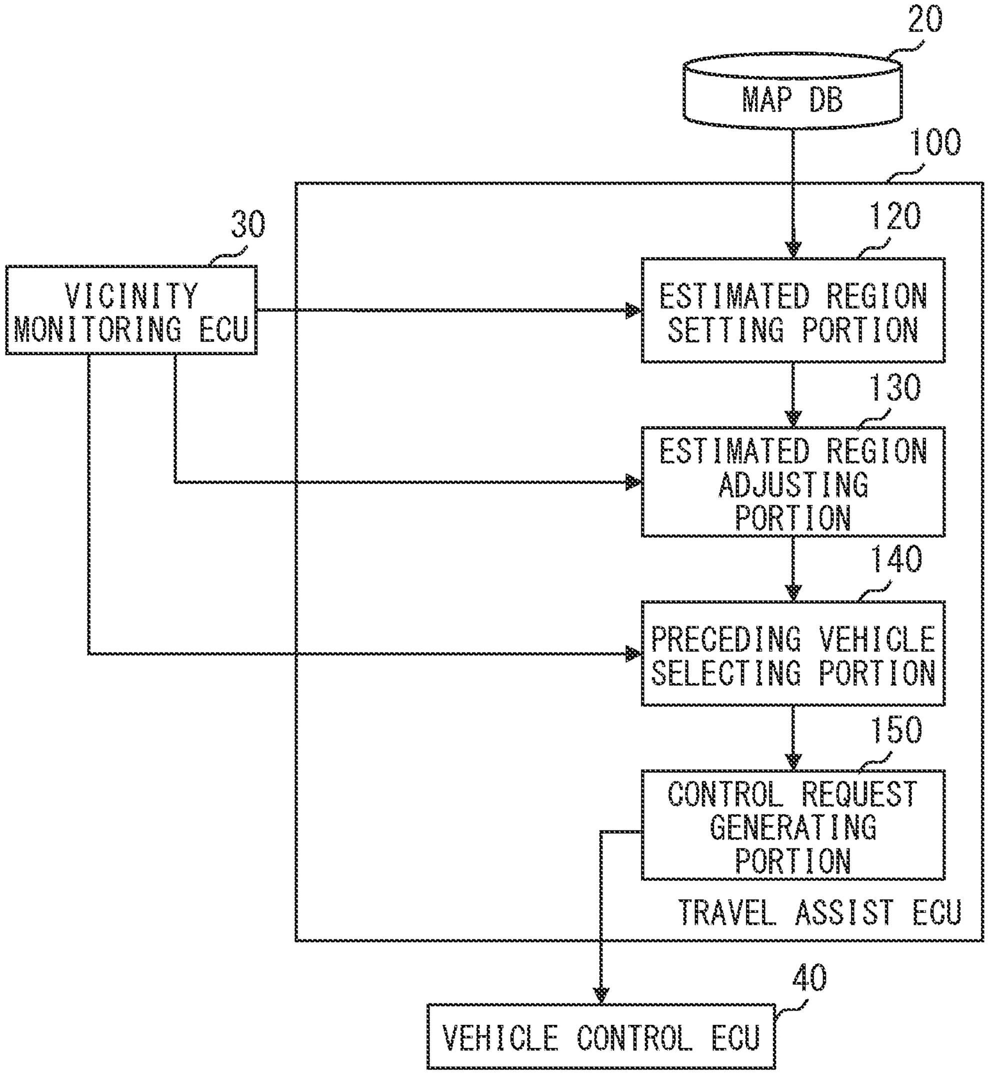
FIG. 5 is a block diagram illustrating functions provided by the travel assist ECU according to a second embodiment.

In more detail, as illustrated in FIG. 5, the estimated region setting portion 120 acquires map information including entrance/exit information about intersections from the map DB 20. The entrance/exit information includes the entrance position and the exit position of an intersection. For example, the entrance position of the intersection corresponds to the position of a stop line in the entrance lane to the intersection. The exit position of the intersection is defined based on the position of a stop line in the opposite lane referring to the exit lane from the intersection. The entrance position and the exit position may be defined based on node positions in the map data. According to the second embodiment, the estimated region setting portion 120 may acquire the entrance/exit information from image information captured by a proximity monitoring camera, for example. The estimated region setting portion 120 may acquire aerial photographs of an intersection from the in-vehicle communication device 50, for example, and acquire the entrance/exit information from the aerial photographs.

Figure 6:
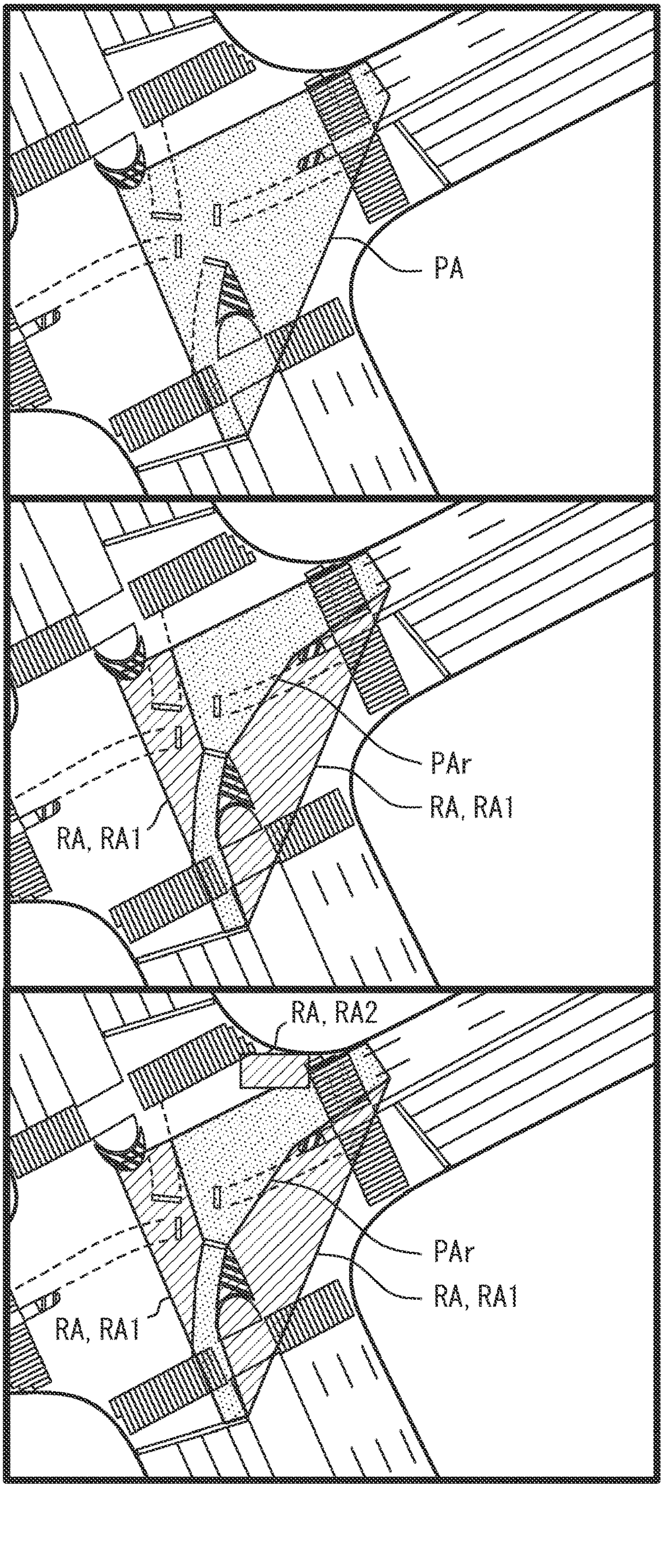
FIG. 6 is a diagram illustrating a way of defining and adjusting an estimated region according to the second embodiment.

As illustrated in FIG. 6, the estimated region setting portion 120 identifies estimated region PA whose boundary is defined by a virtual line passing through at least three points: an intersection entrance, an intersection exit, and a specific point inside the intersection. In the case of taking a right turn at the next intersection, estimated region PA is shaped into a polygon formed by connecting the following points with a straight line: the right endpoint of the entrance and the right endpoint of the exit; the left endpoint of the entrance and the specific point inside the intersection; the specific point and the left endpoint of the exit; the right and left endpoints of the entrance; and the right and left endpoints of the exit. For example, positions of the right and left endpoints of the entrance and the exit may be defined based on the positions of the right and left boundaries of an entrance lane and an exit lane. For example, the specific point is an intersection point between a straight line extending from the left endpoint of the entrance in the entrance-oriented direction and a straight line extending from the left endpoint of the exit in the exit-oriented direction. The case of taking a left turn at the next intersection reverses the left endpoint and the right endpoint described above. The estimated region setting portion 120 may identify estimated region PA that is formed by connecting the points with a curved line instead of a straight line. The estimated region setting portion 120 may identify the entire intersection as estimated region PA.

The estimated region adjusting portion 130 eliminates at least first restricted region RA1 from estimated region PA. According to the second embodiment, the estimated region adjusting portion 130 eliminates both first restricted region RA1 and second restricted region RA2 from estimated region PA. The preceding vehicle selecting portion 140 selects a preceding vehicle based on reduced estimated region PAr that is estimated region PA deprived of restricted regions RA1 and RA2.

For example, the preceding vehicle selecting portion 140 defines the preceding vehicle as an other vehicle that satisfies the area condition, the angle condition, and the distance condition described below. Similar to the first embodiment, the area condition is assumed to be satisfied when the overlapping proportion between the region corresponding to the other vehicle and reduced estimated region PAr exceeds a predetermined threshold range (such as 50% or less).

The angle condition is assumed to be satisfied when a specific relationship is satisfied concerning the angular relationship between the travel direction of the other vehicle and the direction oriented to the entrance and the exit of the intersection. For example, the preceding vehicle selecting portion 140 defines an allowable angular range by adding a predetermined margin to the angular range from an azimuth in the entrance-oriented direction to an azimuth in the exit-oriented direction. The preceding vehicle selecting portion 140 determines that the angle condition is satisfied when the allowable angular range includes the azimuth in the travel direction of the other vehicle. The entrance-oriented direction may correspond to the direction in which the entrance lane extends. The exit-oriented direction may correspond to the direction in which the exit lane extends.

The distance condition is used when there are multiple other vehicles that satisfy the area condition and angle condition. The preceding vehicle selecting portion 140 determines that the distance condition is satisfied for an other vehicle that minimizes the Euclidean distance between subject vehicle A and the other vehicle.

By reference to FIG. 7, the description below explains a flow of the preceding vehicle identification method performed by the travel assist ECU 100 according to the second embodiment. At S210, the estimated region setting portion 120 acquires map information from the map DB 20. The map information contains entrance/exit information at the intersection as a travel-scheduled section. At S220, the estimated region setting portion 120 defines estimated region PA as a region including the entrance and the exit of the intersection, based on the map information.

At S230, the estimated region adjusting portion 130 eliminates first restricted region RA1 based on traffic rules from estimated region PA. At S240, the estimated region adjusting portion 130 eliminates second restricted region RA2 based on the obstacle detection information from estimated region PA. The obstacle detection information is acquired from the proximity monitoring ECU 30. At S250, the preceding vehicle selecting portion 140 selects a preceding vehicle that satisfies the area condition, the angle condition, and the distance condition based on reduced estimated region PAr deprived of restricted regions RA1 and RA2 at S230 and S240. At S260, the control request generating portion 150 generates a control request and outputs it to the vehicle control ECU 40. The process terminates upon completion of the steps described above.

According to the second embodiment, estimated region PA, supposed to include a preceding vehicle, is defined inclusive of the entrance and the exit of the travel-scheduled section for subject vehicle A. Estimated region PA is deprived of first restricted region RA1 that recommends the travel restriction based on traffic rules. The preceding vehicle is defined as an other vehicle that is determined to be included in reduced estimated region PAr comparable to estimated region PA deprived of first restricted region RA1. The preceding vehicle is more likely to be included in reduced estimated region PAr if the preceding vehicle travels in the travel-scheduled section by avoiding first restricted region RA1. The preceding vehicle can be accurately identified.

According to the second embodiment, estimated region PA is further deprived of second restricted region RA2 based on the detection information about obstacles to the travel of subject vehicle A. Estimated region PA can be deprived of a region that may hinder vehicles from traveling. It is possible to inhibit a preceding vehicle from being incorrectly identified in a region where no vehicle can exist. The preceding vehicle can be identified more accurately.

In addition, the second embodiment identifies an other vehicle as a preceding vehicle when it is determined to satisfy the area condition that the overlapping proportion between reduced estimated region PAr and the region corresponding to the other vehicle exceeds the threshold range. The other vehicle can be identified as a preceding vehicle even if the other vehicle partially exceeds estimated region PA. It is possible to avoid too strictly identifying the preceding vehicle and provide easy identification.

Moreover, the second embodiment identifies an other vehicle as a preceding vehicle when it is determined that the area condition is satisfied and the angle condition is satisfied concerning the angular relationship between the travel direction of the other vehicle and the direction oriented to the entrance and the exit. Even if the area condition is satisfied, the other vehicle is not identified as a preceding vehicle when the angle condition on the angular relationship is not satisfied. There may be other vehicles such as oncoming vehicles or vehicles turning left or right in a direction different from subject vehicle A. These other vehicles travel in such a direction as to disable the other vehicles from being identified as a preceding vehicle for subject vehicle A. It is possible to avoid identifying such other vehicles as a preceding vehicle. The preceding vehicle can be identified more accurately.

The second embodiment identifies an other vehicle as a preceding vehicle when the area condition and the angle condition are determined to be satisfied and the other vehicle minimizes the distance to subject vehicle A. The other vehicle nearest to subject vehicle A can be identified as a preceding vehicle when there are multiple other vehicles satisfying the area condition and the angle condition. The preceding vehicle can be reliably identified from among multiple other vehicles.

Other Embodiments

The disclosure of this specification is not limited to the described embodiments. The disclosure includes the described embodiments and modified forms provided by those skilled in the art based on the embodiments. For example, the disclosure is not limited to combinations of the parts and/or elements described in the embodiments. The disclosure is available in various combinations. The disclosure can include an additional part that can be added to the embodiments. The disclosure includes an embodiment that is devoid of the parts and/or elements of the embodiments. The disclosure includes a replacement or a combination of the parts and/or elements between one embodiment and the other embodiment. The disclosed technical scope is not limited to the description of the embodiments. Some of the disclosed technical scopes need to be understood to be available in the description of the claims and to include all changes in the meaning and the scope comparable to the description of the claims.

According to the above-described embodiments, the travel assist ECU 100 identifies a preceding vehicle to follow based on the ACC function. The preceding vehicle may be identified when there is a need for preceding vehicle information during implementation of the advanced driver assist function or the automatic operation function other than the ACC function. For example, the travel assist ECU 100 may perform the above-described process to identify a preceding vehicle so that the automatic operation function can adjust the inter-vehicle distance to the preceding vehicle.

According to the above-described embodiments, the preceding vehicle selecting portion 140 identifies an other vehicle as a preceding vehicle when the other vehicle satisfies the area condition, the angle condition, and the distance condition. Instead, the preceding vehicle selecting portion 140 may not need to determine whether the angle condition and the distance condition are satisfied.

According to the first embodiment, the estimated region adjusting portion 130 eliminates restricted region RA from estimated region PA. However, restricted region RA may not need to be eliminated. Alternatively, it may be favorable to eliminate only first restricted region RA1 based on traffic rules or second restricted region RA2 based on the obstacle detection information. In the second embodiment, the estimated region adjusting portion 130 may define reduced estimated region PAr by eliminating only first restricted region RA1 from estimated region PA without eliminating second restricted region RA2.

According to the first embodiment, the estimated region setting portion 120 defines estimated region PA by adding acceptable error range PA2 to scheduled travel region PA1 corresponding to the width of subject vehicle A added in the width direction of anticipated route PR. Acceptable error range PA2 is a margin in consideration of the behavior of other vehicles. Instead, the estimated region setting portion 120 may define scheduled travel region PA1 based on widths of the intersection entrance and exit where anticipated route PR passes. For example, the estimated region setting portion 120 may define scheduled travel region PA1 as a region sandwiched between an interpolation curve connecting the left end of the intersection entrance with the left end of the intersection exit and an interpolation curve connecting the right end of the intersection entrance with the right end of the intersection exit. The right and left ends of the intersection entrance and exit may correspond to the right and left ends of an entrance lane to the intersection and an exit lane from the intersection traveled by subject vehicle A, for example.

As a modification of the second embodiment, the estimated region adjusting portion 130 may eliminate estimated region PA based on the behavior of subject vehicle A or an other vehicle. At S245 in FIG. 8, for example, the estimated region adjusting portion 130 may eliminate minimum and maximum radius regions from estimated region PA. The minimum radius region ensures a region within the minimum radius and the maximum radius region ensures a region outside the maximum radius for subject vehicle A to make a turn while traveling from the intersection entrance to the intersection exit.

The travel assist ECU 100 may be a dedicated computer configured to include at least a digital circuit or an analog circuit as a processor. The digital circuit is available as at least one type of ASIC (Application Specific Integrated Circuit), FPGA (Field Programmable Gate Array), SOC (System on a Chip), PGA (Programmable Gate Array), and CPLD (Complex Programmable Logic Device), for example. The digital circuit may include memory that stores programs.

The preceding vehicle identification apparatus may be provided by a set of computer resources linked by one computer or data communication device. For example, another ECU may provide part of the functions provided by the preceding vehicle identification apparatus according to the above-described embodiments. A computer installed in the center may provide at least part of the features provided by the travel assist ECU 100.

The above-described embodiments apply to communities that legislate the left-hand traffic. The right and the left in the embodiments are reversed in communities that legislate the right-hand traffic.

The above-described embodiments may be partially summarized as follows.

First point: A preceding vehicle identification program product for identifying a preceding vehicle ahead of a subject vehicle is stored on a non-transitory tangible computer readable medium and includes instructions, when executed by a processor, causing the processor to: acquire an anticipated route along which the subject vehicle is expected to travel at a future time; define a region in which the preceding vehicle is estimated to exist as an estimated region by adding an acceptable error range that is margin of error in predicting a position of the preceding vehicle to a scheduled travel region of the subject vehicle that is defined based on the anticipated route; and identify an other vehicle as the preceding vehicle when the other vehicle is determined to exist in the estimated region. The instructions further causes the processor to identify the other vehicle as the preceding vehicle upon determining that an area condition is met. The area condition is determined to be met when an overlapping proportion between the estimated region and an existing region of the other vehicle exceeds a threshold range.

Second point: The preceding vehicle identification program product according to the first point, wherein the instructions further cause the processor to eliminate, from the estimated region, a restricted region where travel restriction is recommended.

Third point: The preceding vehicle identification program product according to the second point, wherein the instructions further cause the processor to eliminate, from the estimated region, the restricted region that is defined based on a traffic rule.

Fourth point: The preceding vehicle identification program product according to the second point, wherein the instructions further cause the processor to eliminate the restricted region by eliminating, from the estimated region, the restricted region that is defined based on a detection of an obstacle to the subject vehicle.

Fifth point: The preceding vehicle identification program product according to the first point, wherein the instructions further cause the processor to identify the other vehicle as the preceding vehicle upon determining that both the area condition and an angle condition are met, and the angle condition is determined to be met when an angle between the anticipated route and a travel direction of the other vehicle falls into a predetermined angular range.

Sixth point: The preceding vehicle identification program product according to the fifth point, wherein the instructions further cause the processor to identify the other vehicle as the preceding vehicle if the other vehicle has a minimum route length from a start point of the anticipated route to a point nearest to the other vehicle on the anticipated route upon determining that both the area condition and the angle condition are met.

Seventh point: A preceding vehicle identification program product for identifying a preceding vehicle ahead of a subject vehicle is stored on a non-transitory tangible computer readable medium and includes instructions, when executed by a processor, causing the processor to: define an estimated region in which the preceding vehicle is expected to exist, the estimated region including an entrance and an exit of a travel-scheduled section for the subject vehicle; eliminate, from the estimated region, a restricted region where travel restriction is recommended due to a traffic rule; and identify, as the preceding vehicle, an other vehicle upon determining that the other vehicle exists in a reduced estimated region that is defined by eliminating the restricted region from the estimated region. The instructions further causes the processor to identify the other vehicle as the preceding vehicle upon determining that an area condition is met. The area condition is determined to be met when an overlapping proportion between the reduced estimated region and an existing region of the other vehicle exceeds a threshold range.

Eighth point: The preceding vehicle identification program product according to the seventh point, wherein the instructions further cause the processor to eliminate, from the estimated region, the restricted region that is defined based on a detection of an obstacle to the subject vehicle.

Ninth point: The preceding vehicle identification program product according to the seventh point, wherein the instruction further cause the processor to identify the other vehicle as the preceding vehicle upon determining that both the area condition and an angle condition are met, and the angle condition is an angular relationship between a direction oriented to the entrance and the exit and a travel direction of the other vehicle.

Tenth point. The preceding vehicle identification method according to the ninth point, wherein the instruction further cause the processor to identify the other vehicle as the preceding vehicle if the other vehicle has a minimum distance to the subject vehicle upon determining that both the area condition and the angle condition are met.

The invention claimed is:

1. A preceding vehicle identification apparatus to identify a preceding vehicle ahead of a subject vehicle in an intersection, the apparatus comprising:

a processor;

a non-transitory computer-readable storage medium; and a set of computer-executable instructions stored on the non-transitory computer-readable storage medium that cause the processor to:

acquire an anticipated route along which the subject vehicle is expected to travel at a future time;

define an estimated region comprising a region within which no lane is identifiable and an unidentified preceding vehicle is estimated to exist, the estimated region further comprising a scheduled travel region and an acceptable error range, the scheduled travel region comprising a region corresponding to a width of the subject vehicle in a width direction of the anticipated route, the acceptable error range comprising a margin of error in predicting a position of the unidentified preceding vehicle, wherein the acceptable error range is added in the width direction to the scheduled travel region of the subject vehicle;

when there are a plurality of other vehicles in the intersection, determine whether an overlapping proportion between the estimated region and an existing region of each of the plurality of other vehicles exceeds a threshold range; and identify one of the plurality of other vehicles as the preceding vehicle when determining that an area condition is met, wherein the area condition is met when the overlapping proportion of the one of the plurality of other vehicles exceeds the threshold range, wherein the subject vehicle is controlled to follow the identified preceding vehicle.

2. The preceding vehicle identification apparatus according to claim 1, wherein the set of computer-executable instructions further cause the processor to eliminate, from the estimated region, a restricted region where travel restriction is recommended.

3. The preceding vehicle identification apparatus according to claim 2, wherein the set of computer-executable instructions further cause the processor to eliminate, from the estimated region, the restricted region that is defined based on a traffic rule.

4. The preceding vehicle identification apparatus according to claim 2, wherein the set of computer-executable instructions further cause the processor to eliminate, from the estimated region, the restricted region that is defined based on a detection of an obstacle to the subject vehicle.

5. The preceding vehicle identification apparatus according to claim 1, wherein the set of computer-executable instructions further cause the processor to identify the other vehicle as the preceding vehicle upon determining that both the area condition and an angle condition are met, and the angle condition is determined to be met when an angle between the anticipated route and a travel direction of the other vehicle falls into a predetermined angular range.

6. The preceding vehicle identification apparatus according to claim 5, wherein when there are a plurality of other vehicles, the set of computer-executable instructions further cause the processor to identify one of the other vehicles as the preceding vehicle if a distance along the anticipated route from a start point of the anticipated route to a point on the anticipated route nearest to the one of the other vehicles has a minimum length upon determining that both the area condition and the angle condition are met.

7. The preceding vehicle identification apparatus according to claim 1, wherein the acceptable error range is added to both sides of the scheduled travel region of the subject vehicle in the width direction of the anticipated route.

8. The preceding vehicle identification apparatus according to claim 1, wherein the set of computer-executable instructions further cause the processor to, when there are two or more other vehicles among the plurality of other vehicles whose overlapping proportions exceed the threshold range, identify one of the two or more other vehicles as the preceding vehicle that has a shortest distance to the subject vehicle.

9. A preceding vehicle identification method performed by a processor for identifying a preceding vehicle ahead of a subject vehicle in an intersection, the method comprising the steps of:

acquiring an anticipated route along which the subject vehicle is expected to travel at a future time;

defining an estimated region comprising a region within which no lane is identifiable and an unidentified preceding vehicle is estimated to exist, the estimated region further comprising a scheduled travel region and an acceptable error range, the scheduled travel region comprising a region corresponding to a width of the subject vehicle in a width direction of the anticipated route, the acceptable error range comprising a margin of error in predicting a position of the unidentified preceding vehicle, wherein the acceptable error range is added to the scheduled travel region of the subject vehicle;

when there is a plurality of other vehicles in the intersection, determining whether an overlapping proportion between the estimated region and an existing region of each of the plurality of other vehicles exceeds a threshold range; and identifying one of the plurality of other vehicles as the preceding vehicle when determining that an area condition is met, wherein the area condition is met when the overlapping proportion of the one of the plurality of other vehicles exceeds the threshold range, wherein the subject vehicle is controlled to follow the identified preceding vehicle.

10. The preceding vehicle identification method according to claim 9, further comprising the step of:

eliminating, from the estimated region, a restricted region where travel restriction is recommended.

11. The preceding vehicle identification method according to claim 10, wherein the step of eliminating the restricted region further includes eliminating, from the estimated region, the restricted region that is defined based on a traffic rule.

12. The preceding vehicle identification method according to claim 10, wherein the step of eliminating the restricted region further includes eliminating, from the estimated region, the restricted region that is defined based on a detection of an obstacle to the subject vehicle.

13. The preceding vehicle identification method according to claim 9, wherein the step of identifying the other vehicle further includes identifying the other vehicle as the preceding vehicle upon determining that both the area condition and an angle condition are met, and the angle condition is determined to be met when an angle between the anticipated route and a travel direction of the other vehicle falls into a predetermined angular range.

14. The preceding vehicle identification method according to claim 13, wherein when there are a plurality of other vehicles, one of the other vehicles is identified as the preceding vehicle if a distance along the anticipated route from a start point of the anticipated route to a point on the anticipated route nearest to the one of the other vehicles has a minimum length upon determining that both the area condition and the angle condition are met.

15. A preceding vehicle identification apparatus to identify a preceding vehicle ahead of a subject vehicle in an intersection, the apparatus comprising:

a processor;

a non-transitory computer-readable storage medium; and a set of computer-executable instructions stored on the non-transitory computer-readable storage medium that cause the processor to:

define an estimated region comprising a region within which no lane is identifiable and an unidentified preceding vehicle is expected to exist, the estimated region including an entrance of the intersection and an exit of the intersection of a travel-scheduled section for the subject vehicle;

eliminate, from the estimated region, a restricted region where travel restriction is recommended due to a traffic rule; and when there is a plurality of other vehicles in the intersection, determine whether an overlapping proportion between a reduced estimated region, which is defined by eliminating the restricted region from the estimated region, and an existing region of each of the plurality of other vehicles exceeds a threshold range; and identify one of the plurality of other vehicles as the preceding vehicle when determining that an area condition is met, wherein the area condition is met when the overlapping proportion of the one of the plurality of other vehicles exceeds the threshold range, wherein the subject vehicle is controlled to follow the identified preceding vehicle.

16. The preceding vehicle identification apparatus according to claim 15, wherein the set of computer-executable instructions further cause the processor to eliminate, from the estimated region, the restricted region that is defined based on a detection of an obstacle to the subject vehicle.

17. The preceding vehicle identification apparatus according to claim 15, wherein the set of computer-executable instructions further cause the processor to identify the other vehicle as the preceding vehicle upon determining that both the area condition and an angle condition are met, and the angle condition is an angular relationship between a direction oriented to the entrance and the exit and a travel direction of the other vehicle.

18. The preceding vehicle identification apparatus according to claim 17, wherein when there are a plurality of other vehicles, the set of computer-executable instructions further cause the processor to identify the one of the other vehicles as the preceding vehicle if the other vehicle has a minimum distance to the subject vehicle upon determining that both the area condition and the angle condition are met.

19. A preceding vehicle identification method performed by a processor for identifying a preceding vehicle ahead of a subject vehicle in an intersection, the method comprising the steps of:

defining an estimated region comprising a region within which no lane is identifiable and an unidentified preceding vehicle is expected to exist, the estimated region including an entrance of the intersection and an exit of the intersection of a travel-scheduled section for the subject vehicle;

eliminating, from the estimated region, a restricted region where travel restriction is recommended due to a traffic rule;

when there is a plurality of other vehicles in the intersection, determining whether an overlapping proportion between a reduced estimated region, which is defined by eliminating the restricted region from the estimated region, and an existing region of each of the plurality of other vehicles exceeds a threshold range; and identify one of the plurality of other vehicles as the preceding vehicle when determining that an area condition is met, wherein the area condition is met when the overlapping proportion of the one of the plurality of other vehicles exceeds the threshold range, wherein identifying, as the preceding vehicle, an other vehicle upon determining that the other vehicle exists in a reduced estimated region that is defined by eliminating the restricted region from the estimated region, wherein the subject vehicle is controlled to follow the identified preceding vehicle.

20. The preceding vehicle identification method according to claim 19, wherein the step of eliminating the restricted region further includes eliminating, from the estimated region, the restricted region that is defined based on a detection of an obstacle to the subject vehicle.

21. The preceding vehicle identification method according to claim 19, wherein the step of identifying the other vehicle further includes identifying the other vehicle as the preceding vehicle upon determining that both the area condition and an angle condition are met, and the angle condition is an angular relationship between a direction oriented to the entrance and the exit and a travel direction of the other vehicle.

22. The preceding vehicle identification method according to claim 21, wherein the step of identifying the other vehicle further includes identifying the other vehicle as the preceding vehicle if the other vehicle has a minimum distance to the subject vehicle upon determining that both the area condition and the angle condition are met.

* * * * *